UNITED STATES PATENT OFFICE.

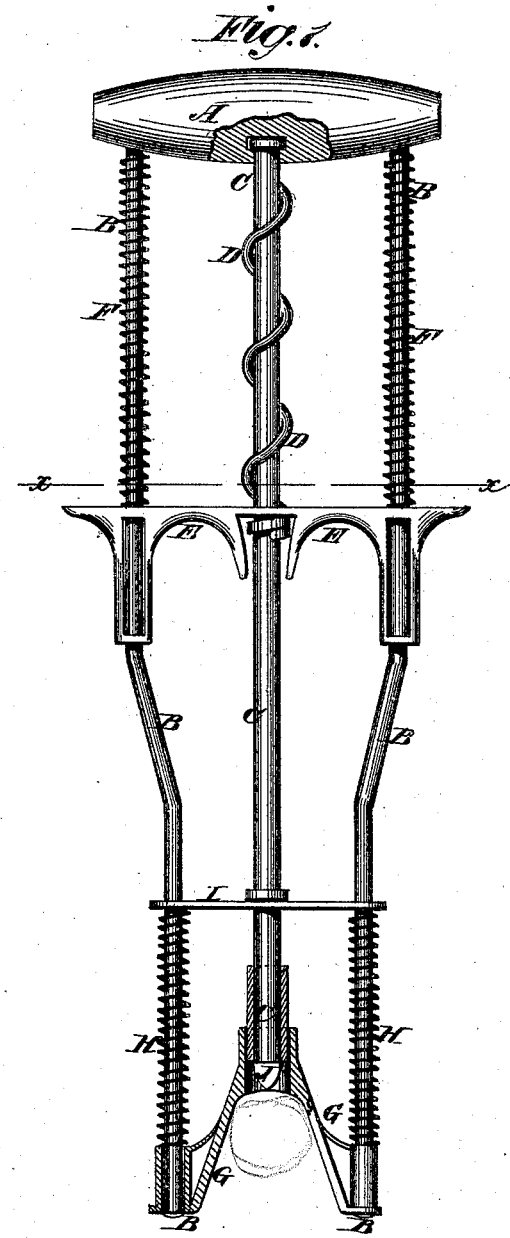

JOSEPH H. KNAUS AND JOHN R. HARFORD, OF NEW FRANKLIN, MISSOURI.

IMPROVEMENT IN TOBACCO-SUCKER-GERM DESTROYERS.

Specification forming part of Letters Patent No. 172,036, dated January 11, 1876; application filed October 2, 1875.

*To all whom it may concern:*

Be it known that we, JOSEPH H. KNAUS and JOHN R. HARFORD, of New Franklin, in the county of Howard and State of Missouri, have invented a new and useful Improvement in Tobacco-Sucker-Germ Destroyers, of which the following is a specification:

Figure 1 is a side view of our improved instrument, parts being broken away to show the construction. Fig. 2 is a cross section of the same, taken through the line $x\ x$, Fig. 1.

Similar letters of reference indicate corresponding parts.

The object of this invention is to furnish an improved instrument for destroying the sucker-germs in tobacco-plants, so as to effectually prevent their growth, and which shall be simple in construction and convenient in use.

The invention consists in the combination of the handle, the side rods, the swiveled rod, having a spiral thread formed upon its upper part, and a cutter attached to its lower end, the sliding cross-bar and its coiled springs, and the forked sliding cross-bar and its coiled springs, with each other, as hereinafter fully described.

A is the handle, to which, near its ends, are attached the ends of two rods, B, the upper halves of which are parallel with each other. At or near their middle points the rods B incline toward each other, and their lower parts are again parallel with each other. To the handle A, midway between the rods B, is swiveled the upper end of a rod, C, which has a spiral thread, D, formed upon its upper part. The three rods B C B pass through holes in the cross-bar E, the central hole having a notch in one side to receive the thread D, so that the rod C may be rotated by the up-and-down movement of the cross-bar E. Upon the end parts of the cross-bar E are formed tubular projections, to receive the rods B and give them a long bearing, so that the cross-bar E may be kept at right angles with the rods B while moving up and down upon them. The lower side of the cross-bar E, between the rods B C, is concaved to form convenient seats for the fingers when operating it. The cross-bar E is pressed down by coiled springs F, placed upon the rods B, between the cross-bar E and the handle A. G is a forked cross-bar or frame, having a socket in its center to receive the lower end of the swiveled rod C, and sockets in its ends to receive the lower ends of the rods B, and is kept from dropping off the rods B C by heads formed upon the ends of the rods B. The forked bar G is held down by coiled springs H, placed upon the lower parts of the rods B, and the lower ends of which rest against the ends of the said forked bar G. The upper ends of the springs H rest against the ends of the cross-bar I, placed upon the three rods B C B, and which rests against a collar formed upon or attached to the swiveled rod C. To the lower end of the swiveled rod C is attached a cutter or drill, J, which I prefer to make in the form of a half-cone, as being best suited for the purpose, but which may be made of any other suitable form. The rod C is made of such a length that when the parts of the instrument are left free the cutter J may be within the socket of the forked bar G.

In using the instrument the handle A is grasped in the hand, with the fingers beneath the cross-bar E, and the fork of the bar G is placed against the tobacco-stalk, directly over the sucker-germ, and is pressed against said stalk with sufficient force to force the forked bar G upward and cause the cutter J to project against said germ. The cross-bar E is then drawn upward with the fingers, which rotates the rod C and cutter J, and cuts out and destroys the germ, so that it will not grow again.

Having thus described our invention, we claim as new and desire to secure by Letters Patent—

The combination of the handle A, the side rods B, the swiveled rod C, having a spiral thread, D, formed upon its upper part, and a cutter, J, attached to its lower end, the sliding cross-bar E and its coiled springs F, and the forked sliding cross-bar G and its coiled springs H, with each other, substantially as herein shown and described.

JOSEPH HENRY KNAUS.
JOHN ROBERT HARFORD.

Witnesses:
HENRY MCKINLEY,
EDW. W. CHILTON.